United States Patent
Kido (10) Patent No.: US 8,264,367 B2
(45) Date of Patent: *Sep. 11, 2012

(54) IN-VEHICLE IMAGE DISPLAY APPARATUS (75) Inventor: Kaoru Kido, Nagoya (JP)

(73) Assignee: ADC Technology, Inc., Nagoya-Shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,043

(22) Filed: Aug. 8, 2011

(65) Prior Publication Data

US 2011/0291917 A1    Dec. 1, 2011

Related U.S. Application Data

(62) Division of application No. 12/915,268, filed on Oct. 29, 2010, now Pat. No. 8,022,836, which is a division of application No. 12/063,787, filed as application No. PCT/JP2006/315669 on Aug. 8, 2006, now Pat. No. 7,847,705.

(30) Foreign Application Priority Data

Aug. 19, 2005  (JP) ................................ 2005-238746

(51) Int. Cl.
    *G08B 5/00* (2006.01)
(52) U.S. Cl. .................................... 340/815.4; 348/148
(58) Field of Classification Search ............... 340/815.4, 340/435; 348/148; 345/7–9; 359/630
    See application file for complete search history.

(56) References Cited

U.S. PATENT DOCUMENTS

| 5,394,517 A | * | 2/1995 | Kalawsky ......................... 345/8 |
| 6,888,447 B2 |   | 5/2005 | Hori et al. |
| 7,847,705 B2 |   | 12/2010 | Kido |
| 8,022,836 B2 | * | 9/2011 | Kido ......................... 340/815.4 |

FOREIGN PATENT DOCUMENTS

| JP | 8106981 | 4/1996 |
| JP | 8 175 228 A | 7/1996 |

(Continued)

OTHER PUBLICATIONS

Notice of Reason(s) for Rejection, Mailing Date Dec. 21, 2010. English Translation Enclosed.

(Continued)

*Primary Examiner* — John A Tweel, Jr.
(74) *Attorney, Agent, or Firm* — Davis & Bujold, P.L.L.C.

(57) ABSTRACT

An in-vehicle image display apparatus comprising a state detecting device that detects a state of vehicle surroundings; a display device provided in at least in a window section of the vehicle and capable of displaying information; an image generating device that generates image data representing an image of the vehicle surroundings based on detection results; a display control device that makes the display device display the image represented by the image data generated by the image generating device; and a storage device that previously stores data representing an object to be detected which is detected by the state detecting device in the vehicle surroundings. The image generating device compares the image data and the data stored in the storage device, and uses data of an object to be detected that is determined to be similar to the object to be detected which is represented by the image data generated by the image generating device itself to thereby generate image data representing the image of the surroundings of the vehicle.

6 Claims, 9 Drawing Sheets

FOREIGN PATENT DOCUMENTS

| | | | |
|---|---|---|---|
| JP | 9 292 245 A | 11/1997 |
| JP | 9292245 | 11/1997 |
| JP | 10 049 800 A | 2/1998 |
| JP | 10049800 | 2/1998 |
| JP | 2000203309 | 7/2000 |
| JP | 2000 211 402 A | 8/2000 |
| JP | 2002014633 | 1/2002 |
| JP | 2002019491 | 1/2002 |
| JP | 2002107154 | 4/2002 |
| JP | 2002 329 202 A | 11/2002 |
| JP | 2003291688 | 10/2003 |
| JP | 2004020223 | 1/2004 |
| JP | 2004064131 | 2/2004 |
| JP | 2004093167 A | 3/2004 |
| JP | 2004210213 A | 7/2004 |
| JP | 2004217188 | 8/2004 |
| JP | 2004354792 | 12/2004 |
| JP | 2005106651 | 4/2005 |
| JP | 2005122371 A | 5/2005 |

OTHER PUBLICATIONS

Notice of Reason(s) for Rejection dated Mar. 13, 2012 and its English Translation.

"Decision of Rejection", dated Nov. 29, 2011.

* cited by examiner

IN-VEHICLE IMAGE DISPLAY APPARATUS

TECHNICAL FIELD

This invention relates to an in-vehicle image display apparatus that displays an image in a window section of a vehicle of a bus, a taxi, a private car or the like.

BACKGROUND ART

One of the conventional causes for vehicle-related accidents such as an accident between vehicles, an accident between a vehicle and a passer-by, etc. is considered an oversight or a misjudgment by a driver on a passer-by, other vehicle, an obstruction or the like in the surroundings of the vehicle, for example due to low visibility by the weather (rain, snow, etc.) or temporary decreased vision of the driver by eyestrain and others. That is the driver is unable to have a correct understanding of the state of the surroundings of the vehicle. Thus, there is a delay in risk aversion, which leads to an accident. To put it the other way around, if the driver can have a correct understanding of the state of the surroundings of the vehicle, an accident can be avoided.

A conventionally known image display device can project an outside state or landscape on a window glass of a vehicle (see Patent Document 1, for example).

The image display device described in this Patent Document 1 includes an observation device that observes a state of the vehicle (position, velocity, and others), and an accumulation device that preaccumulates image information of outside landscapes. Based on information indicating a position of the vehicle observed by the observation device, image information of a landscape which can be possibly seen outside the vehicle at an observed position is obtained from the accumulation device. An image represented by the image information is displayed on a window glass. Map information such as a name of a place, a name of a river, a name of a mountain, etc. can be also displayed. The displayed image can be also sequentially switched according to velocity based on velocity information of the vehicle. As such, one of the image display devices can display on a window glass of a vehicle a landscape image of the surroundings of the vehicle.

Patent Document 1: Unexamined Japanese Patent Publication No. 2004-20223

DISCLOSURE OF THE INVENTION

Problems to be Solved by the Invention

In the conventional image display device as mentioned above, landscape images preaccumulated in the accumulation device are displayed on the window glass of the vehicle. Landscape images outside the currently moving vehicle cannot be displayed. Also, as noted above, if there is low visibility by the weather or temporary decreased vision of the driver, the driver is unable to have a correct understanding of the state of the surroundings. Risk of driving, that is, probability that an accident; may occur, is increased. Accordingly, in order to inhibit an accident, it is necessary to display an image of the surroundings of the moving vehicle in realtime.

An object of the present invention, which was made in view of the above problem, is to accurately replicate the state of the surroundings of a vehicle by an image and display the image in a window section of the vehicle, so that a driver can safely drive the vehicle.

MEANS TO SOLVE THE PROBLEMS

The invention which was made to solve the above problem is an in-vehicle image display apparatus for use in a vehicle. The in-vehicle image display apparatus includes: a State detecting device that detects a state of surroundings of the vehicle; a display device that is provided at least in an entire front window section of the vehicle and capable of displaying information over the entire window section; an image generating device that generates image data for displaying an image of the surroundings of the vehicle on the display device based on detection results from the state detecting device; and a display control device that makes the display device display an image represented by the image data generated by the image generating device.

In the in-vehicle image display apparatus, the state of the surroundings of the vehicle is detected by the state detecting device. Based on the detection results, the image data representing the image of the surroundings of the vehicle is generated by the image generating device. The image represented by the image data generated by the image generating device is then displayed on the display device provided at least in the entire front window section of the vehicle.

According to the in-vehicle image display apparatus, the image representing the state of the surroundings of the vehicle is displayed in the window section of the vehicle. Thus, a driver can reliably understand the state of the surroundings of the vehicle. That is, the in-vehicle image display apparatus can be designed to display an image which is easy for the driver to view, for example by highlighting an image with a moving object, based on the detection results from the state detecting device. Thus, the driver can easily recognize contents of the image, that is, the state of the surroundings. Also, even an image representing the state far away from the vehicle can be displayed in the window section which is close to the driver. Thus, it is easy for the driver to view the image, and easy to understand the far away state. In this manner, the driver can reliably understand the state of the surroundings of the vehicle. Occurrence of an accident due to a delay in danger avoidance can be reliably inhibited. The in-vehicle image display apparatus can be designed such that the state detecting device detects at least an object present in the surroundings.

In the in-vehicle image display apparatus it is preferable, that the display device is capable of being switched between a window state in which scenes inside and outside the vehicle are viewable through the display device by letting lights from inside and outside of the vehicle pass through, and a display state in which the lights from the inside and outside of the vehicle are blocked so that an image can be displayed by the display control device. It is preferable that the display control device switches a state of the display device to the display state to make the display device display an image represented by the image data generated by the image generating device.

In the in-vehicle image display apparatus the display device in the window section of the vehicle can be switched between the window state in which the scene on the opposed side is viewable like an ordinary window and the display state in which an image is displayed.

According to the in-vehicle image display apparatus, only when the image in the surroundings of the vehicle is to be displayed, the display device is switched into the display state. When an image is not to be displayed, the display device is switched into the window state like an ordinary window. Accordingly, it is easy for the driver or the passenger to use.

In the in-vehicle image display apparatus, the display device may be also provided in side and rear window sections of the vehicle. Specifically, in case that the state of the display device can be switched as in the in-vehicle image display apparatus, it is preferable that the display device is designed to be capable of switching the state of the display device between the window state and the display state in each window section.

According to the in-vehicle image display apparatus, information can be displayed in all the window sections of the vehicle. Since an image representing the state of the surroundings of the vehicle can be displayed in all the window sections of the vehicle, the driver can drive the vehicle more safely by the reasons as noted above. Moreover, the display device of each window section is switchable between the window state like an ordinary window and the display state in which an image is displayed. Accordingly, it is possible to switch the state of the display device to the ordinary window state per window section so that the passenger can enjoy a real landscape. The passengers's needs to enjoy a real landscape can be also satisfied.

In the in-vehicle image display apparatus, it is preferable that the display control device switches the state of the display device between the window state and the display state based on an input from a passenger of the vehicle.

According to the in-vehicle image display apparatus, the passenger can switch the state of the display device of the window section(s) of the vehicle between the display state and the window state freely. Thus, it is convenient for the passenger.

The in-vehicle image display apparatus may include a driving state detecting device that detects at least one of a velocity, a moving direction, or a braking state of the vehicle, and the display control device may be designed to switch the state of the display device between the window state and the display state based on detection results from the driving state detecting device.

According to the in-vehicle image display apparatus, the state of the display device is switched in accordance with the driving state of the vehicle regardless of intention of the driver. For example, the display device in the window section(s) may be designed to switch the state of the display device to the display state and display an image of the surroundings when the velocity of the vehicle is over a certain velocity. Also, the display device in the window section(s) may be designed to switch the state of the display device to the ordinary window state when the vehicle is stopped.

That is, for example, when the velocity of the vehicle is over a certain velocity as noted above, it may become difficult for the driver to understand the state of the surroundings. At that time, however, an image of the surroundings may be displayed in the window section(s) so that the driver can understand the state of the surroundings. Accordingly, the driver can drive the vehicle more safely. Also, if the state of the window section is switched to the ordinary window state when the vehicle is stopped, the passenger can fully enjoy a real landscape.

In the in-vehicle image display apparatus, it is preferable that the display control device makes the display device display an image of rearward surroundings of the vehicle when the vehicle moves backward.

According to the in-vehicle image display apparatus, a rearward image of the vehicle is displayed in the window section when the driver moves the vehicle backward. Thus, the driver can drive the vehicle more safely. The window section where the rearward image of the vehicle is displayed may be the front window section or the rear window section of the vehicle. Furthermore, the rearward image may be displayed in the side window section(s) or all the window sections.

It is preferable that the in-vehicle image display apparatus includes a sound output device that outputs sounds of the surroundings of the vehicle based on the detection results from the state detecting device.

According to the in-vehicle image display apparatus, sounds are outputted from the sound output device in addition to the image of the surroundings of the vehicle. Therefore, the state of the surroundings of the vehicle is reproduced more realistically. The driver can have a more accurate understanding of the state of the surroundings of the vehicle.

It is preferable that the in-vehicle image display apparatus includes a storage device that stores the image data generated by the image generating device.

According to the in-vehicle image display apparatus, the image data is stored in the storage device. Thus, the image data can be read so that an image represented by the image data can be seen even after driving. Accordingly, it is convenient for the passenger.

It is preferable that, in the in-vehicle image display apparatus, the image generating device generates the image data such that a passer-by or other vehicle in the surroundings of the vehicle is highlighted by the display device.

According to the in-vehicle image display apparatus, the image is generated such that the driver can easily recognize the passer-by, other vehicle, or the like in the surroundings of the vehicle. Thus, the driver is forced to pay attention to the passer-by and other vehicle. That is, it is possible to call attention of the driver.

It is preferable that, in the in-vehicle image display apparatus, the display device is capable of displaying information on both inside and outside faces of the vehicle and the display control device makes the display device display an image different from the image represented by the image data generated by the image generating device on the outside face of the display device.

According to the in-vehicle image display apparatus, an image can be displayed on each face of the display device. Thus, for example, it is possible to display an image of the surroundings on the inside face as noted above, and to display a message, etc. to a driver of other vehicle, a passer-by, etc. on the outside face. Smooth traffic can be further achieved by displaying a message and promoting communication with people in the surroundings in this manner. Advertisement may be also displayed on the outside face.

It is preferable that the in-vehicle image display apparatus includes a reading device that reads image data recorded on a recording medium, and the display control device makes the display device display an image represented by the image data read from the recording medium by the reading device.

According to the in-vehicle image display apparatus, the image represented by the image data recorded on the recording medium can be also displayed in the window section(s). Thus, it is easy for the passenger to use.

It is preferable that the in-vehicle image display apparatus includes: a collision determining device that determines whether the vehicle is incapable of avoiding a collision with other vehicle based on detection results from the state detecting device; a probability determining device that, if it is determined by the collision determining device that the collision with other vehicle is unavoidable, determines whether there is a collidable static object from among static objects except for the other vehicle based on the detection results from the state detecting device; and a vehicle control device that, if it is determined by the probability determining device that there is a collidable static object, controls the vehicle to collide with the static object.

Specifically, the vehicle control device may control a brake, an output of a power source (an internal combustion engine, a motor, and others, for example) and a rudder angle of the vehicle.

In the vehicle provided with the in-vehicle image display apparatus, if there is a condition that a collision with another vehicle in the surroundings is inevitable, a possibly collidable object except for the other vehicle is searched. If there is such an object, the vehicle is controlled to collide with the object. That is, a collision with other vehicle is avoided even though the vehicle collides with the object other than the other vehicle, to limit the damage. According to this in-vehicle image display apparatus, the damage by the collision can be limited to a minimum.

EXPLANATION OF REFERENCE NUMERALS

1 . . . vehicle, 2 . . . frame section, 5 . . . in-vehicle image display apparatus, 10 . . . infrared sensor, 12 . . . millimeter wave radar, 14 . . . ultrasonic wave sensor, 16 . . . CCD camera, 18 . . . microphone, 20, 22 . . . I/O, 24 . . . CCD I/F, 30 . . . CPU, 32 . . . ROM, 34 . . . RAM, 36 . . . HDD, 37 . . . reader, 38 . . . frame memory, 39 . . . drawing processor, 40 . . . display glass panel, 42 . . . speaker, 44 . . . operating section, 45 . . . projector, 50 . . . bus, 80 . . . detecting unit, 90 . . . in-vehicle unit, 95 . . . input/output section.

BEST MODE FOR CARRYING OUT THE INVENTION

Figure 1:
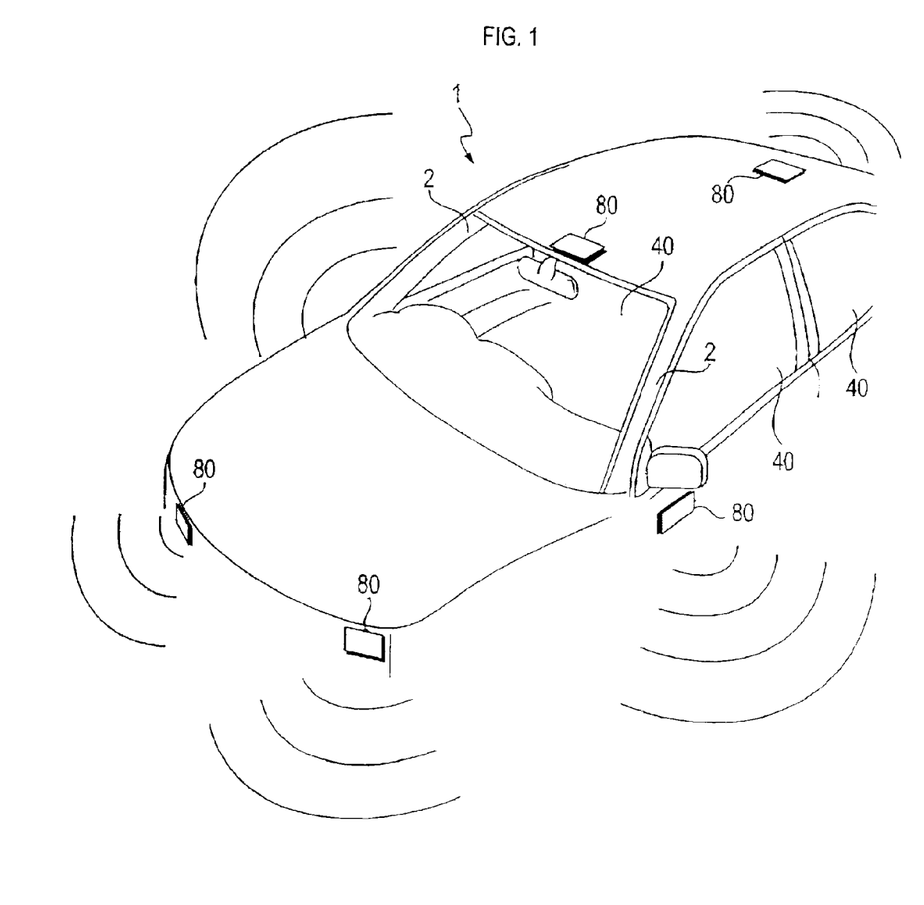
[FIG. 1] an appearance diagram showing an appearance of a vehicle provided with an in-vehicle image display apparatus.

An embodiment of the present invention will be explained hereafter, by way of the drawings.
[First Embodiment]
FIG. 1 is an appearance diagram showing an appearance of a vehicle 1 provided with an in-vehicle image display apparatus 5 (see FIG. 2) of the present embodiment. As shown in FIG. 1, a detecting unit 80 of the in-vehicle image display apparatus 5 for detecting the state of the surroundings of the vehicle 1 is provided at a plurality of positions outside the body of the vehicle 1. This detecting unit 80 detects the state of the surrounding scene, surrounding people, other vehicle (hereinafter, also referred to as other vehicle), obstruction and others, as the state of the surroundings of the vehicle 1. Although not shown in FIG. 1, an in-vehicle unit 90 (see FIG. 2) composing the in-vehicle image display apparatus 5 is provided inside the vehicle 1 aside from the detecting unit 80. Based on detection results from the detecting unit 80, an image representing the state of the surroundings of the vehicle 1 is generated by the in-vehicle unit 90.

Specifically, in the present embodiment, a display glass panel 40 that is capable of displaying an image on the overall window section is provided in all the window sections of the vehicle 1. This display glass panel 40 is designed to be switched between a display mode and an ordinary mode. The display mode functions as a liquid crystal display and allows display of an image. The ordinary mode is a transparent state like an ordinary window and allows viewing of scenes over the window. An image of the surroundings of the vehicle 1 generated by the in-vehicle unit 90 is displayed on the display glass panel 40. The display glass panel 40 displays the image of the surroundings of the vehicle 1 on a face corresponding to the inside of the vehicle 1 in order to allow viewing from the inside of the vehicle 1. In the present embodiment, the display glass panel 40 is also designed to be capable of displaying an image on a face corresponding to the outside of the vehicle.

Figure 2:
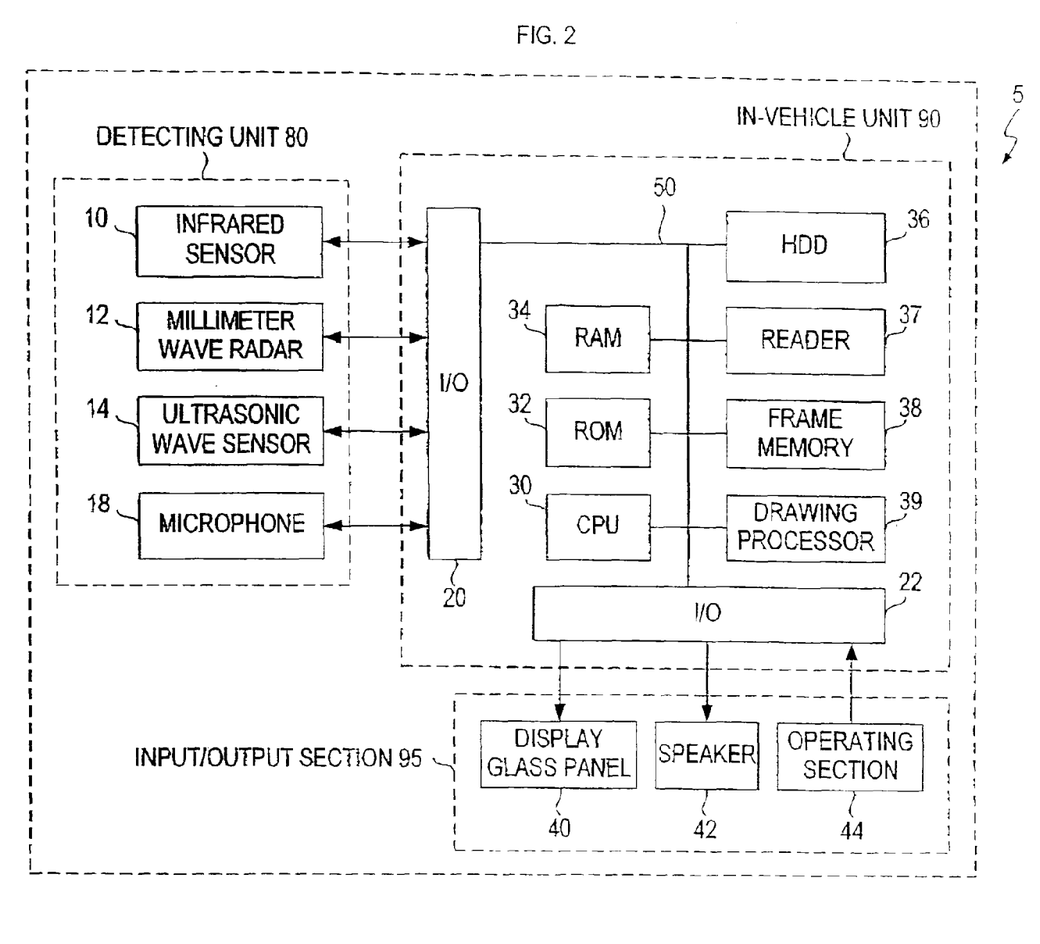
[FIG. 2] a block diagram showing a structure of the in-vehicle image display apparatus.

FIG. 2 is a block diagram showing a structure of the in-vehicle image display apparatus 6.

As shown in FIG. 2, the in-vehicle image display apparatus 5 of the present embodiment is composed of the aforementioned detecting unit 80, in-vehicle unit 90 and an input/output section 95 including the display glass panel 40. Detailed descriptions of the respective components are given hereinafter.

Firstly, the in-vehicle unit 90 is installed inside the vehicle 1. The in-vehicle unit 90 includes a CPU 30 that executes various processes; a ROM 32 that stores programs (BIOS), etc. for a starting process executed by the CPU 30 when starting the in-vehicle unit 90; a RAM 34 that is used as a storage area when the CPU 30 performs various processes; a hard disk (hereinafter, referred to as HDD) 36 that stores information therein; a reader 37 that reads information recorded on a recording medium such as a CD-ROM/RAM, a DVD-ROM/RAM, etc.; a drawing processor 39 that generates image data representing the state of the surroundings of the vehicle 1 based on data transmitted from the detecting unit 80; a frame memory 38 that stores image data generated by the drawing processor 39; an input/output interface (hereinafter, referred to as I/O) 20 for transmitting and receiving data to and from the detecting unit 80; and an I/O 22 for transmitting and receiving data to and from the input/output section 95. These components are mutually connected by a bus 50.

The detecting unit 80 includes an infrared sensor 10, a millimeter wave radar 12, an ultrasonic wave sensor 14, and a microphone 18. In each component, various data later described is detected per microscopic time Δt.

In the detecting unit 80, the infrared sensor 10 detects infrared ray emitted from an object. Infrared ray is emitted from every object. By specifying the range of the emission source of infrared ray using the infrared sensor 10, a rough profile of the object can be known. From the strong and weak of the emitted infrared ray (strength of infrared ray is different depending on temperature or properties such as thermal conductivity, etc. of the object), it is possible to estimate a rough shape, material, and others of the object. In the present embodiment, an estimation process that estimates the material (whether metal or not, for example) of the object from the strength of infrared ray is executed by a not shown microcomputer composing the infrared sensor 10. The estimation process is a process conventionally performed in an infrared sensor. Therefore, detailed explanation is not given here. Data representing estimation results, the range of the emission source of infrared ray detected by the infrared sensor 10, and data representing the strength of infrared ray are transmitted to the in-vehicle unit 90.

The millimeter wave radar 12 uses millimeter wave (electric wave having a frequency of 30 to 300 GHz) to detect a distance between the irradiation source that irradiates the millimeter wave (here, the vehicle 1) and the object, and a relative velocity of the vehicle 1 with respect to the object. That is, a distance to the object is detected from time when millimeter wave is irradiated until when the irradiated wave is reflected on the object and returns. By detecting the distance from the object per a predetermined time t (t<Δt), the relative velocity to the object is also detected. Data representing the distance to the object detected by the millimeter wave radar 12 and the relative velocity is transmitted to the in-vehicle unit 90.

The ultrasonic wave sensor 14 irradiates ultrasonic wave to the surroundings. The ultrasonic wave sensor 14 measures the position, size, shape and volume of the object from reflection wave of the irradiated ultrasonic wave. In the present embodiment, an ultrasonic wave sensor that can perform three dimensional measurement is used as the ultrasonic wave sensor 14. That is, the shape of the object can be shown in three dimensions. Data representing the position, profile, shape and volume of the object measured by the ultrasonic wave sensor 14 is transmitted to the in-vehicle unit 90.

The microphone 18 detects sounds of the surroundings of the vehicle 1. For example, the sounds of the surroundings are speaking voices of people, animal calls, driving sounds of other vehicles or the like. Data representing the detected sounds is transmitted to the in-vehicle unit 90.

Each detection data detected by the detecting unit 80 and transmitted to the in-vehicle unit 90 is received by the in-vehicle unit 90 via the I/O 20 and stored in the RAM 34. At this time, the CPU 30 instructs the drawing processor 39 to generate image data based on the detection data. The drawing processor 39 reads the detection data from the RAM 34 and generates image data based on the detection data. An image represented by the image data is displayed on the display glass panel 40.

The input/output section 95 includes the aforementioned, display glass panel 40, a speaker 42 that outputs sounds, and an operating section 44 for supply of information.

The speaker 42 is provided to output the sounds of the surroundings via the speaker 42 based on data representing the sounds detected by the microphone 18 out of the aforementioned detection data. A speaker of an audio device (not shown) ordinarily provided in the vehicle 1 may be used.

The operating section 44 is operated by the passenger of the vehicle 1. The passenger operates this operating section 44 to switch the mode of the display glass panel 40 between the aforementioned display mode and ordinary mode. The switching can be performed per window section.

Figure 3:
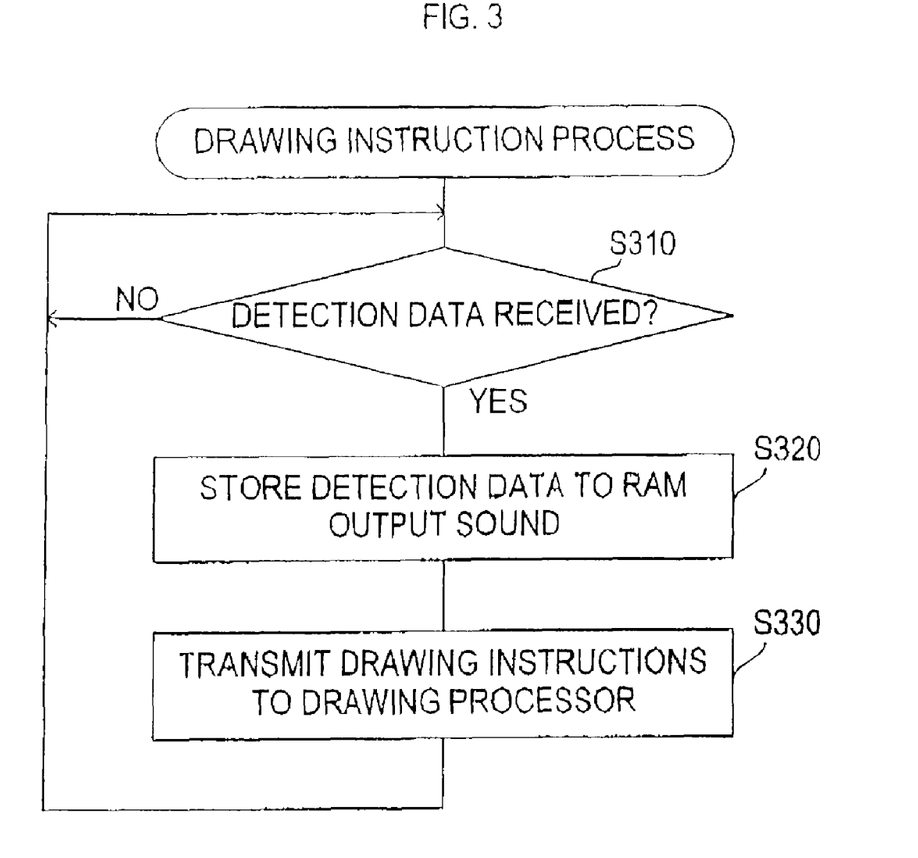
[FIG. 3] a flowchart illustrating a flow of a process executed by a CPU of the in-vehicle image display apparatus.

Now, explanation is given on a drawing instruction process repeatedly performed by the CPU 30 of the in-vehicle unit 90 by way of FIG. 3. This process is executed so as to make the drawing processor 39 generate image data.

In the drawing instruction process, it is determined firstly in S310 whether detection data has been received from the detecting unit 80. If it is determined that detection data has been received, the process moves to S320. The received detection data is stored in the RAM 34. At this time, based on sound data contained in the detection data, the sounds in the surroundings of the vehicle 1 are outputted from the speaker 42. The sounds that can be emitted from the object represented by the detection data may be estimated, and the estimated sounds may be emitted from the speaker 42. For example, in case that another vehicle is detected, the engine sounds and honking horns estimated to be emitted from the other vehicle may be outputted from the speaker 42. In this case, the sound data representing the sounds like the engine sounds and the honking horns may be prestored in the ROM 32 and the HDD 36. When the other vehicle is detected, the sound data representing those sounds may be read out form the ROM 32 or the HDD 36.

Subsequently, the process moves to S330. The drawing instructions to generate image data are transmitted to the drawing processor 39. The process again returns to S310.

If it is determined in S310 that the detection data has not been received, the determination step of S310 is again repeated.

Figure 4:
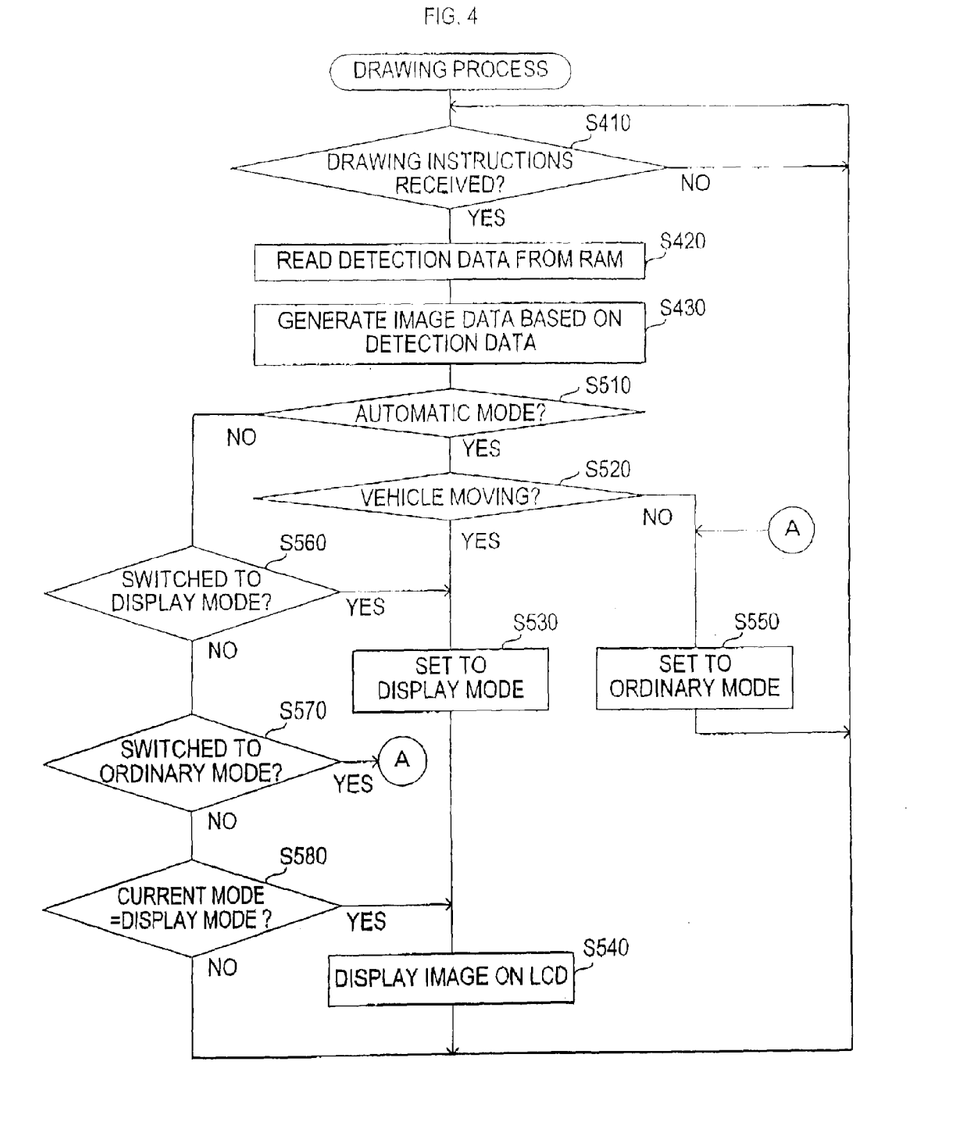
[FIG. 4] a flowchart illustrating a flow of a process executed by a drawing processor of the in-vehicle image display apparatus.

Now, description is given on the drawing process repeatedly executed by the drawing processor 39 by way of FIG. 4.

In this drawing process, it is determined firstly in S410 whether the drawing instructions have been received from the CPU 30. As previously noted, the drawing instructions are instructions to make this drawing processor 39 generate image data. The drawing instructions are transmitted from the CPU 30 by the step of S330 in FIG. 2. When it is determined in S410 that the drawing instructions have not been received, the step of S410 is again executed.

When it is determined in S410 that the drawing instructions have been received, the process moves to S420. The detection data is read from the RAM 34. The detection data is transmitted from the detection unit 80 and stored in the RAM 34 by the step of S320.

In subsequent S430, image data of the surroundings of the vehicle 1 is generated based on the detection data read out from the RAM 34 in S420. Here, particular explanation is given on a method for generating image data.

Firstly, as previously noted, the detection data representing a distance between the vehicle 1 and the object for a position of the object) and a relative velocity is transmitted from the millimeter wave radar 12, the detection data representing the profile, shape, and material of the object is transmitted from the infrared sensor 10, and the detection data representing the profile, shape, volume and position of the object is transmitted from the ultrasonic wave sensor 14, to the in-vehicle unit 90. These detection data are stored in the RAM 34.

The drawing processor 39 generates image data of the surroundings of the vehicle from the aforementioned detection data stored in the RAM 34. Out of data composing the image data, the data representing the profile and shape of the object is generated based on the detection data transmitted from both the infrared sensor 10 and the ultrasonic wave sensor 14. That is, an average is taken of the data representing the profile or shape transmitted from the infrared sensor 10 and the data representing the profile or shape transmitted from the ultrasonic wave sensor 14. The resultant data is considered as data representing the profile or shape of the object. With respect to data of the position of the object as well, an average is taken of data representing the position transmitted from both the millimeter wave radar 12 and the ultrasonic wave sensor 14. The resultant; data is considered as data of the position of the object.

In case that detection accuracy of one of the sensors (that is, the infrared sensor 10, the ultrasonic wave sensor 14 or the millimeter wave radar) is deteriorated by disturbance, for example influence by weather, the detection data from the other sensor is adopted. There is low probability that the detection accuracy of the both sensors is deteriorated at the same time. In other words, it is unlikely that the detection accuracy of the both sensors is deteriorated at the same time.

If there is at least data of the profile, shape and position of the object generated this way, the state of the surroundings of the vehicle can be shown based on the data.

Specifically, in the present embodiment, the drawing processor 39 estimates what the object is based on data of the material and volume of the object in addition to data of the profile and shape of the object. For example, it is estimated that the object is a human, a tree, or a vehicle. In the present embodiment, data representing the profile, shape, material, volume, color, etc. of the object such as a tree, a human, or a vehicle, is stored in the ROM 32 for a plurality of kinds (or a plurality of types) of trees, humans, and vehicles. The drawing processor 39 associates and compares data elements of the data of the object generated by itself with data elements of the data of the object stored in the ROM 32. That is, the drawing processor 39 compares the data generated by itself and the data stored in the ROM 32 respectively for the data of the profile, shape, material and volume. As a result of comparison, the drawing processor 39 determines which of the corresponding data stored in the ROM 32 is close to the respective data generated, that is, what (human, tree, or vehicle, or type thereof) is shown by the generated data of the object. The data representing the object like a tree, a human, a vehicle, etc. may be stored in the HDD 36 as a database.

By estimating the object in this manner, a colored image can be generated. For example, if it is determined that the object indicated by the generated data is a tree, color data is extracted from data for a tree stored in the ROM 32. By adding the extracted color data to the generated data of the object, it is possible to display a colored image of the object.

In the present embodiment, in case that the object is a movable body such as a human, a vehicle, etc., the image of the object is highlighted and colored on the display glass panel 40 so as to be easily recognized by the driver. Colors which easily stimulate the driver into recognition by being highlighted may be fluorescent colors and primary colors.

In the present embodiment, estimated data for the profile (in other words, size) and position after a predetermined time of the detected object can be generated based on the data representing the relative velocity detected by the millimeter radar 12. When displaying the image of the object on the display glass panel 40, an image of the object based on the estimated data may be displayed.

In this manner, a so-called computer graphic (CG) image of the state of the surroundings of the vehicle 1 is generated based on the detection data from the detecting unit 80.

In S430, the image data is generated as mentioned above. Also, the image data is temporarily stored in the frame memory 38. Furthermore, the image data is stored on the HDD 36 by setting the in-vehicle unit 90 to a predetermined setting state via the operating section 44.

If the image data is set to be stored on the HDD 36, a passenger of the vehicle 1 can read the image data stored on the HDD 36 to view an image later on. That is, for example, if the image data at a drive is stored, it is possible to view and enjoy an image at the drive later on. If an image of the surroundings is stored when heading for a destination where a traveling path is complex and easy to lose, it is possible to review the image to confirm the traveling path later on. In this manner, it is possible to reach the destination smoothly next time.

In the present embodiment, the reader 37 is provided which can read data recorded on a recording medium such as a CD-ROM/RAM, a DVD-ROM/RAM, etc. The image data recorded on the recording medium is read through the reader 37 so that an image represented by the image data can be displayed on the display glass panel 40. Thus, map information together with the image of the surroundings can be displayed on the display glass panel 40, using the recording medium recording map data. Accordingly, it is convenient for the driver. Also, by using the recording medium recording a movie and a live image, the movie and the live image can be displayed on the display glass panel 40. Accordingly, the passenger can enjoy the movie and the live image in the vehicle 1.

In the present embodiment, the state of the display glass panel 40 of the vehicle 1 can be switched between the display mode and the ordinary mode. There are switching modes of an automatic mode for automatic switching and a manual mode for switching based on an input from the operating section 44. Whether to choose the automatic mode or the manual mode can be preset via the operating section 44.

In S510 continuing from S430, it is determined whether the switching mode is the automatic mode. If it is determined that the switching mode is the automatic mode, the process moves to S520. It is determined whether the vehicle 1 is moving. Particularly, it is determined whether the velocity of the vehicle 1 is equal to zero based on detection results by a not shown velocity sensor provided in the vehicle 1.

If it is determined in S520 that the vehicle 1 is moving, the process moves to S530. The display glass panel 40 is set to the display mode. In the present embodiment, the display glass panel 40 of all the window sections of the vehicle 1 is set to the display mode.

Figure 6:
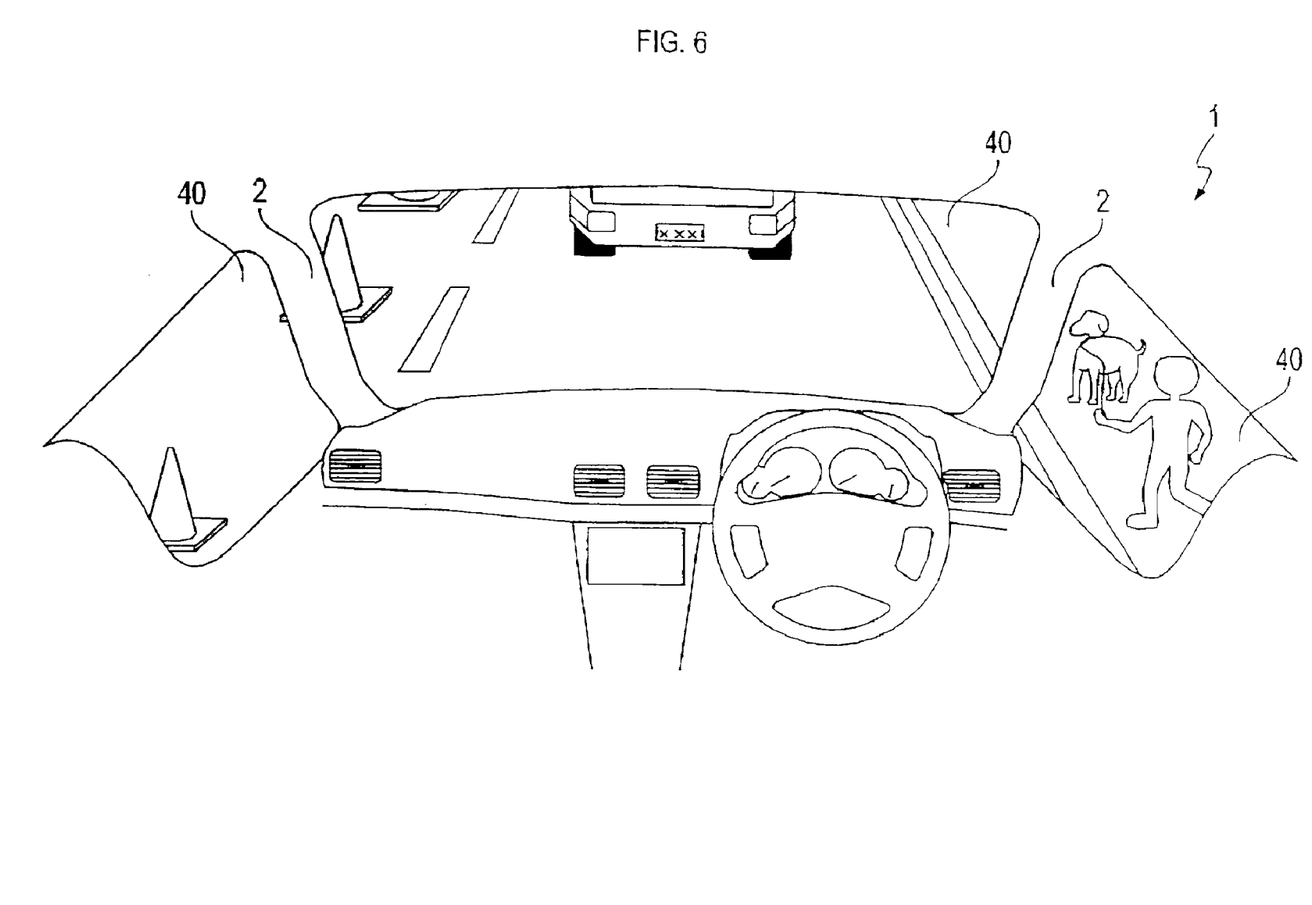
[FIG. 6] a view showing a state in which an image is displayed in a window section of the vehicle.

In subsequent S540, an image represented by the image data generated in S430 is displayed on the display glass panel 40 (see FIG. 6). Although not shown, in case that the vehicle 1 is moving backward, a rear image of the vehicle 1 is displayed on the front display glass panel 40. At this time, the rear image of the vehicle 1 may be displayed on the rear window section (display glass panel 40) or on the side window section(s) of the vehicle 1. Alternatively, the rear image may be displayed on all the window sections.

On the other hand, if it is determined in S520 that the vehicle 1 is not moving, the process moves to S550. The display glass panel 40 is set to the ordinary mode. The process returns to S410 again.

Also in S510, if it is determined that the switching mode is not the automatic mode, that is, the switching mode is the manual mode, the process moves to S560. It is determined whether switching to the display mode is made based on an input from the operating section 44. If it is determined that switching to the display mode is made, the process moves to S530 to set the display glass panel 40 into the display mode.

On the other hand, if it is determined in S560 that switching to the display mode is not made, the process moves to S570 to determine whether switching to the ordinary mode is made.

If it is determined in S570 that switching to the ordinary mode is made, the process moves to S550 to set the display glass panel 40 to the ordinary mode.

If it is determined in S570 that switching to the ordinary mode is not made, the process moves to S580 to determine whether the current mode is the display mode. If it is determined that the current mode is the display mode, the process moves to S540 to display an image on the display glass panel 40.

If it is determined in S580 that the current mode is not the display mode, that is, the current mode is the ordinary mode, the process returns again to S410.

In this drawing process, the mode of the display glass panel 40 is set based on whether or not the vehicle is moving (S520), that is, the velocity of the vehicle. However, a moving direction, a braking state, and others of the vehicle may be also taken into consideration. For example, with respect to the display glass panel 40 on the sides of the vehicle 1, if the vehicle 1 is turning to right, the display glass panel 40 on the right side may be set to the display mode. If the vehicle is turning to left, the display glass panel 40 on the left side may be set to the display mode.

As previously noted, the display glass panel 40 can display an image on both faces of the display glass panel 40. In the present embodiment, for example, a message notifying the surroundings that the vehicle 1 carries a baby, a message of gratitude when a path is cleared, etc. are displayed on the outside face of the display glass panel 40. The data representing these messages and others are prestored in the ROM 32. When instructions to display message information indicating the type of message and the message are supplied by a passenger via the operating section 44, a message based on the message information is displayed on the outside face of the display glass panel 40. The display glass panel 40 may be designed such that a text of a message can be supplied through the operating section 44.

By displaying a message to a driver of another vehicle in the manner, mutual communication is achieved and facilitation of traffic can be promoted. Thus, occurrence of an accident can be inhibited. The display glass panel 40 may be also designed to display advertisement, etc.

Figure 5:
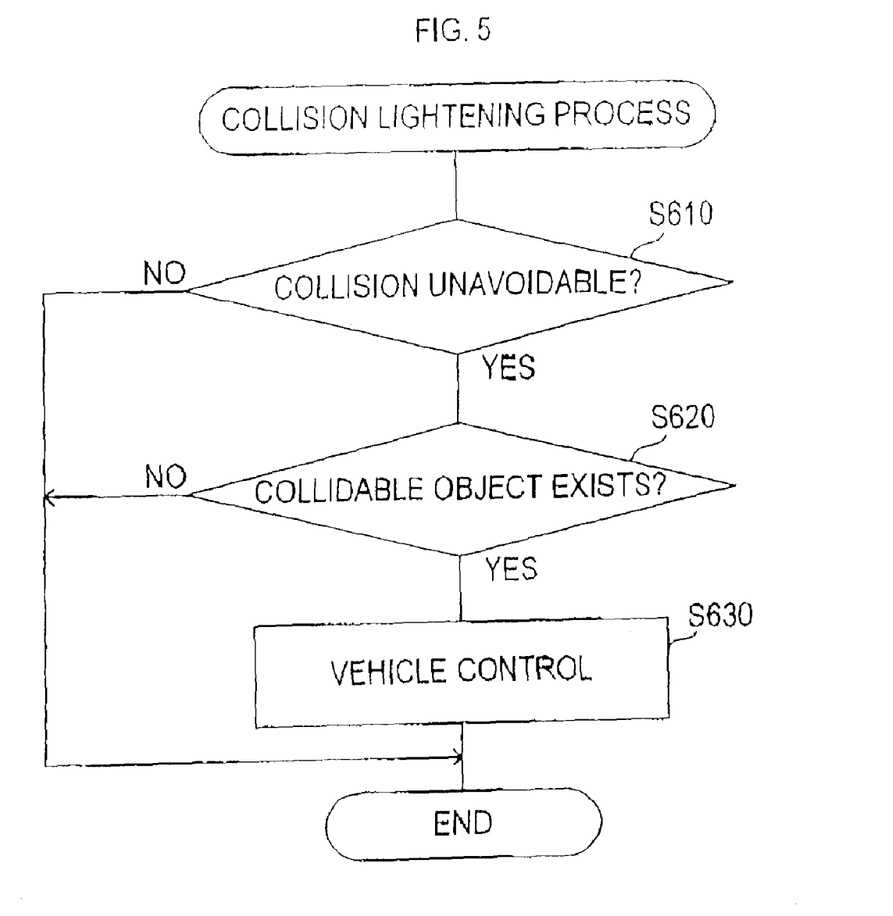
[FIG. 5] a flowchart illustrating a flow of a collision lightening process executed by the CPU of the in-vehicle image display apparatus.

FIG. 5 is a flowchart illustrating a flow of a collision lightening process repeatedly executed by the CPU 30.

In this collision lightening process, it is determined firstly in S610 whether the vehicle 1 is in a state that a collision with another vehicle is unavoidable, particularly based on the velocity and acceleration of the vehicle 1 detected by a not shown in-vehicle sensor (e.g., velocity sensor) provided with the vehicle 1, the position, velocity or velocity relative to the vehicle 1 of other vehicle detected by the detecting unit 80, and various performance such as braking performance and turning performance of the vehicle 1. Performance data representing the performance of the vehicle 1 is prestored in the ROM 32.

If it is determined in S610 that the vehicle 1 is in a state that a collision is unavoidable, the process moves to S620. On the other hand, if it is determined that the vehicle 1 is in a state that a collision is avoidable, the process is ended.

In S620, it is determined whether there is a collidable object in the surroundings other than the other vehicle in a state that a collision is unavoidable. In the step of S620, a static object such as a guardrail is targeted as a collidable object.

If it is determined that there is a collidable object, the process moves to S630. On the other hand, if it is determined that there is no collidable object, the process is ended.

In S630, the vehicle 1 is controlled so as to collide with the collidable object. Particularly, the brake and a throttle opening (and output of the engine) of the vehicle 1 are controlled to adjust the velocity of the vehicle 1. The rudder angle is controlled to adjust the moving direction of the vehicle 1. In this manner, the vehicle 1 is made to collide with the static object. That is, the collision lightening process is a process executed to avoid a collision between the vehicle 1 and the other vehicle in the surroundings even if the vehicle 1 is made to collide with another static object. If this process can avoid a collision between the vehicle 1 and another vehicle, the damage can be limited even if the vehicle 1 collides with the static object.

In the present embodiment, the detection unit 80 corresponds to the state detecting device. The drawing processor 39 corresponds to the image generating device and the display control device. The display glass panel 40 corresponds to the display device. The CPU 30 corresponds to the driving state detecting device. The speaker 42 corresponds to the sound output device. The HDD 36 corresponds to the storage device. The reader 37 corresponds to the reading device. The step of S610 corresponds to the collision determining device. The step of S620 corresponds to the probability determining device. The stop of S630 corresponds to the vehicle control device.

As described in the above, in the in-vehicle image display apparatus 5 of the present embodiment, the state of the surroundings of the vehicle 1 is detected by the detecting unit 80. Based on the detection results, image data of the surroundings of the vehicle 1 is generated by the drawing processor 39 of the in-vehicle unit 90 (S430 in FIG. 4). An image (computer graphic image) indicated by the generated image data is displayed on the display glass panel 40 provided in the window section of the vehicle 1 (see S540 in FIG. 4, and FIG. 6). Accordingly, the driver of the vehicle 1, when seeing the image displayed on the display glass panel 40 of the window section, can easily and accurately understand the state of the surroundings of the vehicle 1. Thus, it is possible to reliably inhibit occurrence of an accident due to a delay in danger avoidance by the driver who does not have a correct understanding of the state of the surroundings of the vehicle 1 resulting from worsening weather or weakening eyesight of the driver.

In the present embodiment, all the window sections of the vehicle 1 are structured as the display glass panel 40. That is, the image of the surroundings can be displayed in all the window sections of the vehicle 1. Accordingly, the driver can have more correct understanding of the state of the surroundings. For the reasons as mentioned above, occurrence of an accident can be more reliably inhibited.

In the present embodiment, the display glass panel 40 is designed to switch the state of the display glass panel 40 between the display mode capable of displaying an image and the ordinary mode being a state like an ordinary window. The switching can be automatically made depending on the driving state of the vehicle 1 (automatic mode), or can be made based on operation of the passenger of the vehicle 1 (manual mode). In the case of the automatic mode, an image of the surroundings is displayed in the window section of the vehicle 1 regardless of intention of the driver. The driver can reliably understand the state of the surroundings. In the case of the manual mode, the passenger can freely enjoy a real landscape.

In the present embodiment, a speaker is provided in the vehicle 1. The sounds in the surroundings of the vehicle 1 detected by the microphone 18 of the detecting unit 80 are outputted from the speaker 42. Accordingly, the state of the surroundings of the vehicle 1 is reproduced more realistically. Thus, the driver can have more correct understanding of the state of the surroundings.

[Second Embodiment]

Figure 7:
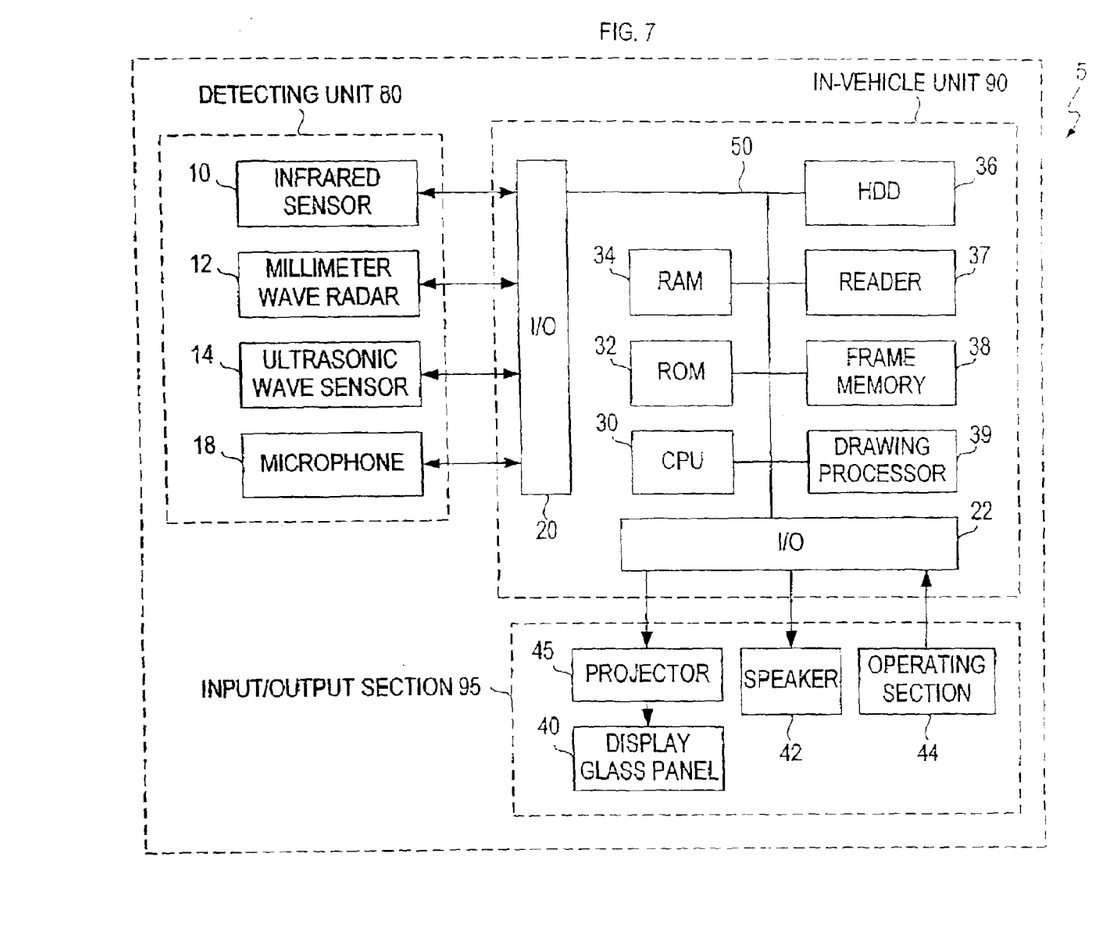
[FIG. 7] a block diagram showing a structure of in-vehicle image display apparatus of a second embodiment.
Figure 8:
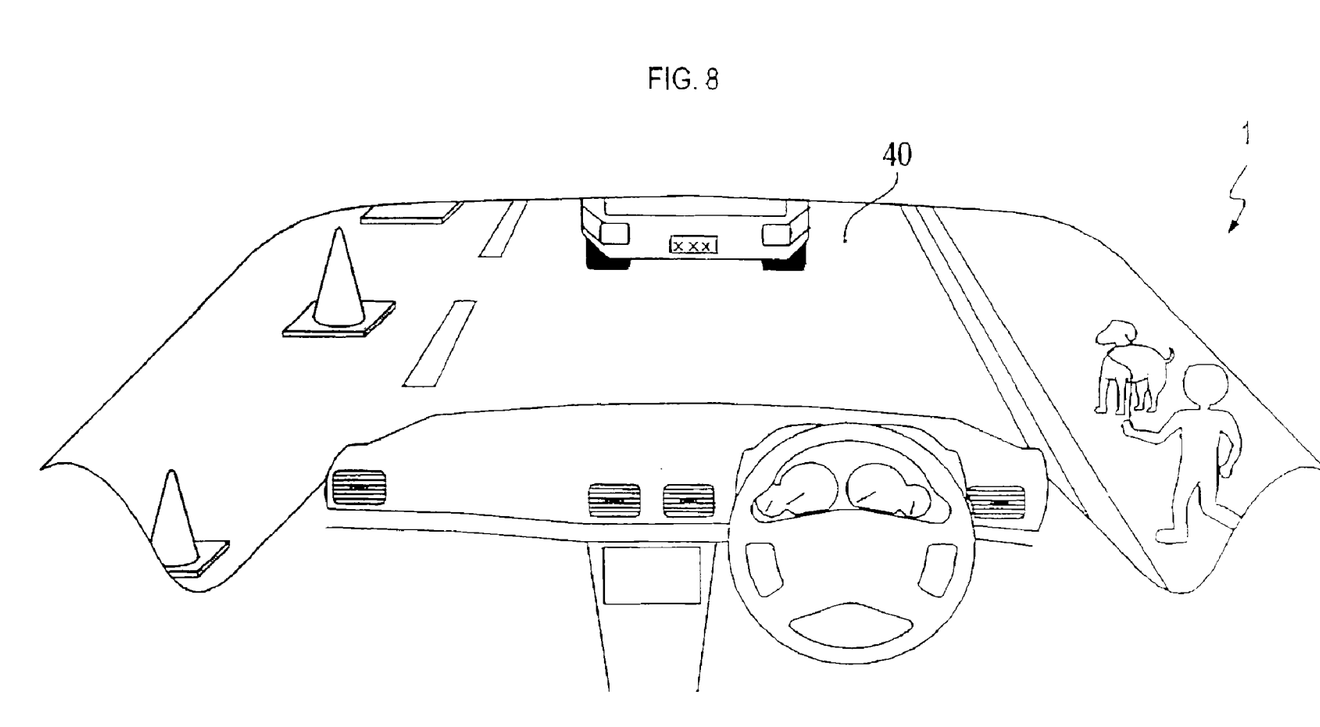
[FIG. 8] a view showing a state in which an image is displayed in a window section of the vehicle (the second embodiment).

Now, the in-vehicle image display apparatus 5 of the second embodiment will be explained by way of FIGS. 7 and 8.

In the in-vehicle image display apparatus 5 of the present second embodiment in comparison with that of the first embodiment, the display glass panel 40 in the window section of the vehicle 1 is designed to be switched between a screen display mode functioning as a screen and the ordinary mode like an ordinary window. In the screen display mode, lights from inside and outside of the vehicle 1 are blocked. That is, the display glass panel 40 turns into a smoky state and functions as a screen. On the display glass panel 40 in a state of the screen display mode, an image is projected by a projector 45 (see FIG. 7).

Especially in the present second embodiment, an image is also displayed on the inside face of A-pillars 2 (see FIGS. 1 and 6) of the vehicle 1 regarded as a screen, other than the display glass panel 40 in the screen display mode. If an image of the surroundings is displayed in the window section and on the A-pillars 2 of the vehicle 1, it seems as if there is no blind angle from the inside of the vehicle 1 (see FIG. 8). Accordingly, the driver can have a more correct understanding of the state of the surroundings of the vehicle 1. Occurrence of an accident can be more reliably inhibited.

In the present second embodiment, the projector 45 and the display glass panel 40 correspond to the display device.

An image may be projected on not only the A-pillars but B pillars and C-pillars, that is, all the pillars inside the vehicle 1. In the first embodiment, if a display panel such as a liquid crystal display and the like is provided in each pillar section, the same effect can be obtained.

[Third Embodiment]

Figure 9:
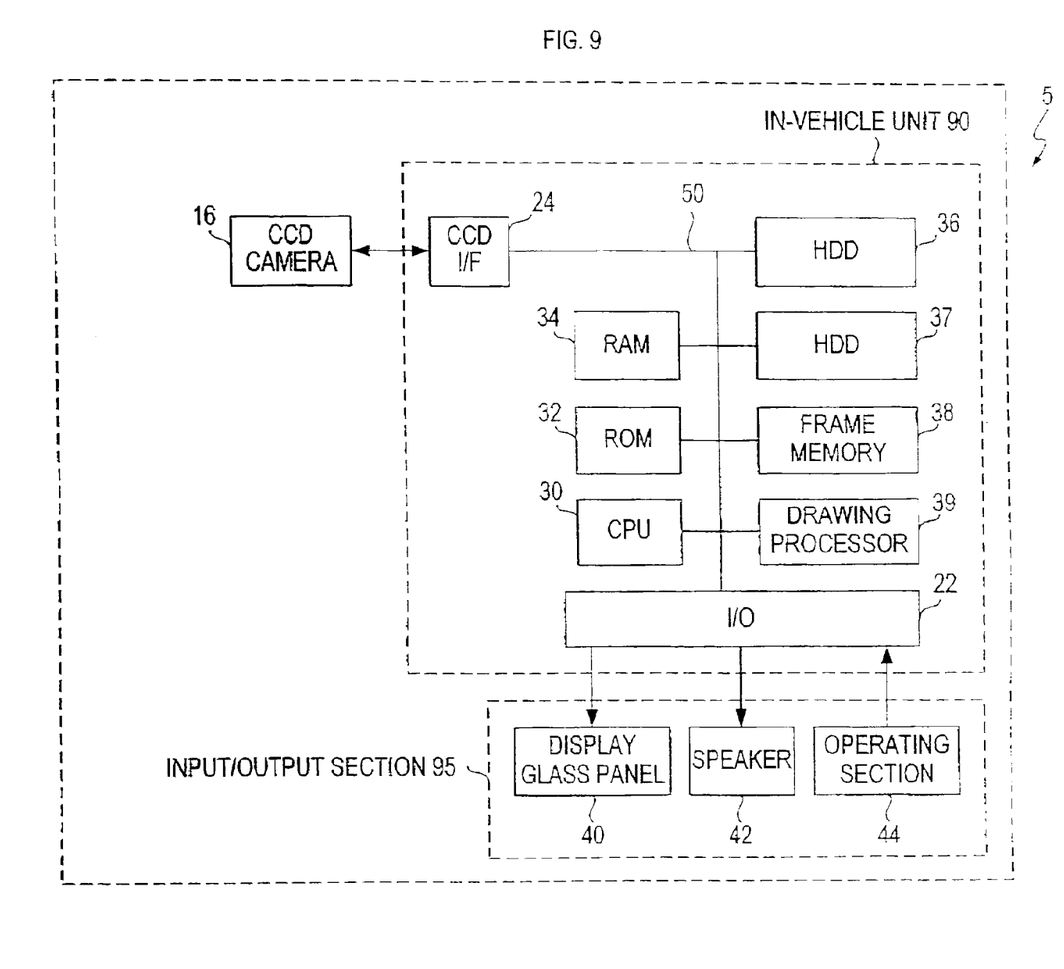
[FIG. 9] a block diagram showing a structure of an in-vehicle image display apparatus of a third embodiment.

Now, the in-vehicle image display apparatus 5 of the third embodiment will be explained by way of FIG. 9.

The in-vehicle image display apparatus 5 of the present third embodiment is different from that of the first embodiment in that a CCD camera 16 is used instead of the detecting unit 80. Also, in the in-vehicle unit 90, a CCD interface (hereinafter, referred to as CCD I/F) 24 is provided to exchange data with the CCD camera 16 instead of the I/O 20.

Imaging data (in other words, detection data) representing an image taken by the CCD camera 16 is transmitted to the in-vehicle unit 90 to be stored in the RAM 34 of the in-vehicle unit 90. The drawing processor 39 adds coloring data to the imaging data (detection data) stored in the RAM 34 to generate a computer graphic image in the step of S430 in FIG. 4. An image taken by the CCD camera 16 may be directly displayed on the display glass panel 40.

According to the in-vehicle image display apparatus 5 of the present third embodiment, the state of the actual surroundings is imaged by the CCD camera 16. Thus, it is easy to generate a computer graphic image representing the state of the surroundings. Since more accurate computer graphic image for the state of the surroundings can be generated, the driver can have a more correct understanding of the state of the surroundings based on the image. Accordingly, occurrence of an accident can be more reliably inhibited.

In the present third embodiment, the CCD camera 16 corresponds to the state detecting device.

The embodiments of the present invention are described in the above. However, the present invention should not be limited to the above embodiments, and can take various modes within the technical scope of the present invention.

For instance, the in-vehicle image display apparatus of the present invention can be used not just for the vehicle (private car and the like) as shown in FIG. 1 but for the vehicle of a bus, a taxi, or a railroad.

Furthermore, the state of the surroundings may be notified to the driver by voice. In this case, for example, information of what an object is, if any, information on the size of the object, the distance, etc., or information concerning danger of a collision with the object may be notified to the driver by voice.

In the first embodiment or the second embodiment, a CCD camera may be incorporated into the detecting unit 80. In this case, for example, in the day time when it is light, imaging data from the CCD camera may be used to generate a computer graphic image. In the night time when it is dark or when the weather is bad, detection data from the sensor other than the CCD camera may be used.

The invention claimed is:

1. An in-vehicle image display apparatus for use in a vehicle, comprising:
    a state detecting device that detects a state of surroundings of the vehicle;
    a display device that is provided at least in a window section of the vehicle and capable of displaying information over the window section;
    an image generating device that generates image data representing an image of the surroundings of the vehicle based on detection results from the state detecting device;
    a display control device that makes the display device display the image represented by the image data generated by the image generating device; and
    a storage device that previously stores data representing an object to be detected which is detected by the state detecting device in the surroundings of the vehicle,
    wherein the image generating device compares the image data generated based on detection results from the state detecting device and the data stored in the storage device, and uses data of an object to be detected that is determined to be similar to the object to be detected which is represented by the image data generated by the image generating device itself, among objects to be detected which are represented by the data stored in the storage device, to thereby generate image data representing the image of the surroundings of the vehicle.

2. The in-vehicle image display apparatus according to claim 1, wherein
    the image generating device synthesizes a part of data with respect to an object to be detected that is determined to be similar to the object to be detected which is represented by the image data generated by the image generating device itself, among objects to be detected which are represented by the data stored in the storage device with the image data generated by the image generating device itself, to thereby generate image data representing the image of the surroundings of the vehicle.

3. The in-vehicle image display apparatus according to claim 1,
    wherein the object to be detected includes a plurality of kinds of objects to be detected, each kind of object to be detected including a plurality of types of objects to be detected, and
    the storage device stores data on the plurality of kinds of objects to be detected, and also stores data on the plurality of types of objects to be detected included in each kind of objects to be detected.

4. The in-vehicle image display apparatus according to claim 1,
    wherein the image data includes first element data of elements constituting the object to be detected, and the data stored in the storage device includes second element data of the elements constituting the object to be detected, and
    the image generating device compares the first element data constituting the image data generated by the image generating device itself and the second element data corresponding to the first element data and being stored in the storage device.

5. The in-vehicle image display apparatus according to claim 1,
    wherein the storage device stores data representing at least one of profile, shape, material, volume, color of the object to be detected as data representing the object to be detected.

6. The in-vehicle image display apparatus according to claim 1,
    wherein the state detecting device includes a detection unit that detects a material constituting the object to be detected.

* * * * *